United States Patent [19]

Spiegel et al.

[11] Patent Number: 5,246,578
[45] Date of Patent: Sep. 21, 1993

[54] FILTER PRESS AND CLEANING MEANS THEREFOR

[75] Inventors: Peter Spiegel, Oberbuchsiten; Hans Käch, Niederacherli, both of Switzerland

[73] Assignee: Von Roll AG, Gerlafingen, Switzerland

[21] Appl. No.: 834,671

[22] Filed: Feb. 11, 1992

[30] Foreign Application Priority Data

Feb. 20, 1991 [CH] Switzerland .................. 513/91

[51] Int. Cl.$^5$ ................... B01D 25/172; B01D 25/32
[52] U.S. Cl. ............................ 210/225; 210/230; 210/236; 210/237; 210/409; 134/76; 134/133; 134/172
[58] Field of Search .............. 210/236, 237, 224, 225, 210/230, 791, 797, 409; 100/198, 199; 134/76, 133, 172

[56] References Cited

U.S. PATENT DOCUMENTS

| | | | |
|---|---|---|---|
| 2,442,272 | 5/1948 | Jaffa | 134/172 |
| 4,172,792 | 10/1979 | Heinrich et al. | 210/230 |
| 4,289,618 | 9/1981 | Schotten et al. | 210/230 |

Primary Examiner—Matthew O. Savage
Attorney, Agent, or Firm—EGLI International

[57] ABSTRACT

In order that higher demands on the purity of the separated liquid can be satisfied, a cleaning plant (12) having wash chambers (13a,b) for the cleaning of the filter plates (8) is arranged in longitudinal direction alongside of a filter press (1). By means of a transport device (30) having a displacement device (32) which is moveable along rails (31a) and is equipped with a raisable and lowerable gripper (37) which can be engaged via pawls with filter plates (8), the filter plates, after the opening of the filter press (1), are transported one after the other into the cleaning plant (12), sprayed in one of the wash chambers (13a, b) with simultaneous drawing off of the air or subjected to an immersion bath, possibly disinfected or impregnated, dried and transported back. By the development of the cleaning plant (12) with two wash chambers (13a, b), idle paths of the displacement device (32) are substantially avoided. The relative arrangement selected for the filter press (1) and the cleaning plant (12) makes it possible to design the transport device (30) in simple manner.

17 Claims, 10 Drawing Sheets

FILTER PRESS AND CLEANING MEANS THEREFOR

The present invention relates to a filtration plant in accordance with the preamble to Claim 1. Such plants are used in many industrial fields in order to remove suspended matter from a liquid. One typical use is in municipal and industrial sludge draining. However, there are also other fields of use, for instance, chemistry, the foodstuff industry and medicine.

A filtration plant is known having a filter press and a cleaning plant, which is developed as a frame which can be moved along the filter press and bears a swingable spray pipe. The filter plates, which are covered with filter cloths, are sprayed directly in the filter press. Such cleaning is completely sufficient for most fields of use. However, there are also fields of use, for instance in medicine, which make such high demands on the purity of the liquid separated that the depositing on the cleaned filter plates of aerosols produced upon the spraying cannot be tolerated. Furthermore, such aerosols may constitute a danger to the health of the operating personnel or constitute en endangering of the environment.

This is where the present invention wishes to provide a remedy. The invention, as set forth in the claims, provides a filtering plant in which an exchange of gas between the place where the cleaning of the plates is effected and the environment, particularly of the filter press which contains filter plates which have already been cleaned, is substantially avoided or in any event reduced to an amount which is noninjurious for the use.

The advantages obtained by the invention reside, in particular, in the fact that the possible field of use of filtration plants of this type is expanded to fields in which the demands on the clean separation of a liquid from the suspended matter contained in it are particularly stringent, for instance for hygienic reasons or in cases where the suspended matter may contain components which are injurious to the environment or dangerous to the operating personnel, and this without the filtration process being made substantially more complicated or slower.

Filtration plants in accordance with the invention are particularly suitable for use in medicine, for instance for the filtration of blood plasma.

The invention will be described in further detail with reference to the drawings, which show merely an embodiment. In the drawings.

FIGS. 5a-f show the emptying of the filter press,

FIGS. 6a-g show the cleaning of the filter plates.

Figure 1:
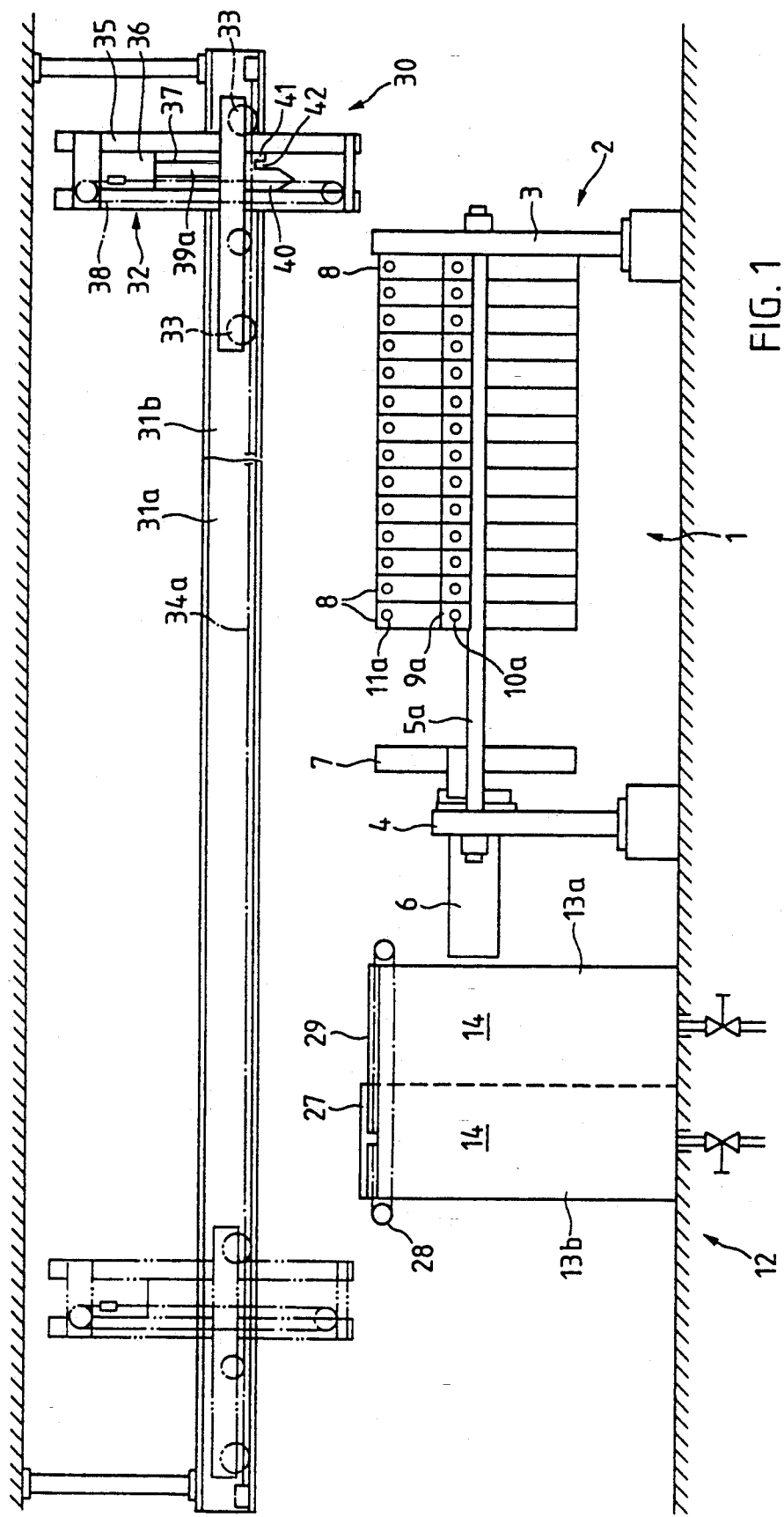
FIG. 1 is a side view of the filtration plant of the invention.

The filtration plant comprises a filter press 1 having a press frame 2 consisting of a head stand 3, a cylinder stand 4 and spars 5a, 5b connecting the two of them. The cylinder stand 4 bears a push-piston drive 6 for the actuating of a press plate 7 which, in filter operation, presses a number of filter plates 8 covered with filter cloths together, each of said plates being supported by support grips 9a, 9b, on the spars 5a,b. In FIG. 1 the filter press 1 is shown open. On the side of the support grips 9a,b there are arranged drive bolts 10a,b and, at its upper end, each filter plate 8 bears two carrying bolts 11a,b.

In longitudinal direction along side the filter press 1 there is a cleaning plant 12 with at least one wash chamber, preferably two wash chambers 13a,b. Each of the parallelepiped housings 14 of the wash chambers 13a,b are suitable to receive one filter plate 8. Each of the wash chambers 13a,b, contains a closed spray pipe 15 which is guided along the side walls and can be moved up and down by means of a surrounding drive 16, e.g. belt, chain, drive or similar, and is connected, via a valve 17, to a connection 18 which serves for the feeding of cleaning liquid. Furthermore, each of the wash chambers 13a, b is provided with a feed line 19 which is connected to a suction blower 23 and a drying blower 24 via valves 20 and 21 and 22, respectively. An outlet 25 serves for the discharge of spent cleaning liquid. A holding pedestal 26 serves for the dependable support of the filter plate 8 which is to be cleaned. The wash chambers 13a,b are watertight on the bottom and side walls so that they can also be filled with cleaning liquid.

The two wash chambers 13a,b, are arranged directly alongside of each other—their housings 14 have a wall in common. They also have a cover 27 in common, which cover can be pushed back and forth by a surrounding drive 28 between openings 29 on the topside of the wash chambers 13a,b so that it alternately closes one or the other of the openings 29.

A transport device 30 comprises rails 31a,b which extend in the longitudinal direction of the filter press 1 and are suspended above the press as well as above the cleaning plant 12, said rails bearing a displacement device 32 which, provided with wheels 33 and driven via drive rods 34a,b, can be moved along the rails 31a,b. Within the frame 35 of the displacement device 32a, lift device 36 is anchored, having a gripper 37 which can be moved up and down by means of a chain drive 38. The gripper 37 has two arms 39a,b each of which bears a separating wedge 40 at its lower end and, alongside thereof, a driver finger 41, wedge and finger forming a downwardly open slot 42 between each other. Furthermore, the gripper 37 bears on top two gripper pawls 43a,b. Each of them has a lug 44 which is fastened to a support pipe 46 which is displaceable laterally by means of a push-piston drive 45.

The operation of the filtration plant will now be described. The filtration process itself has been known for a long time and will not be further explained.

Figure 5A:
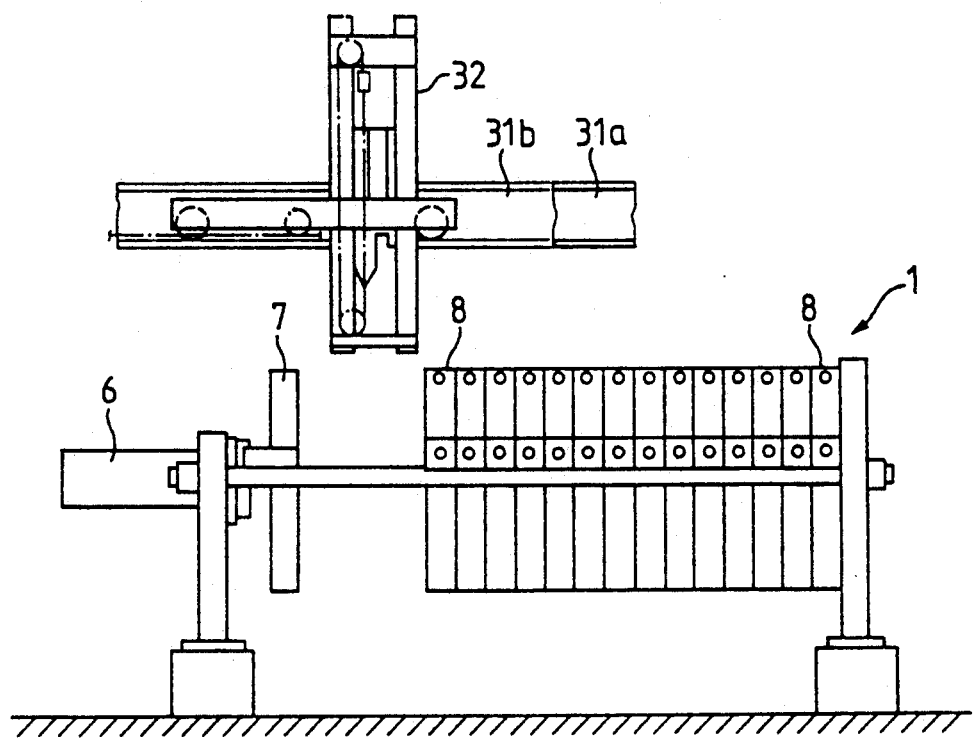
Figure 5B:
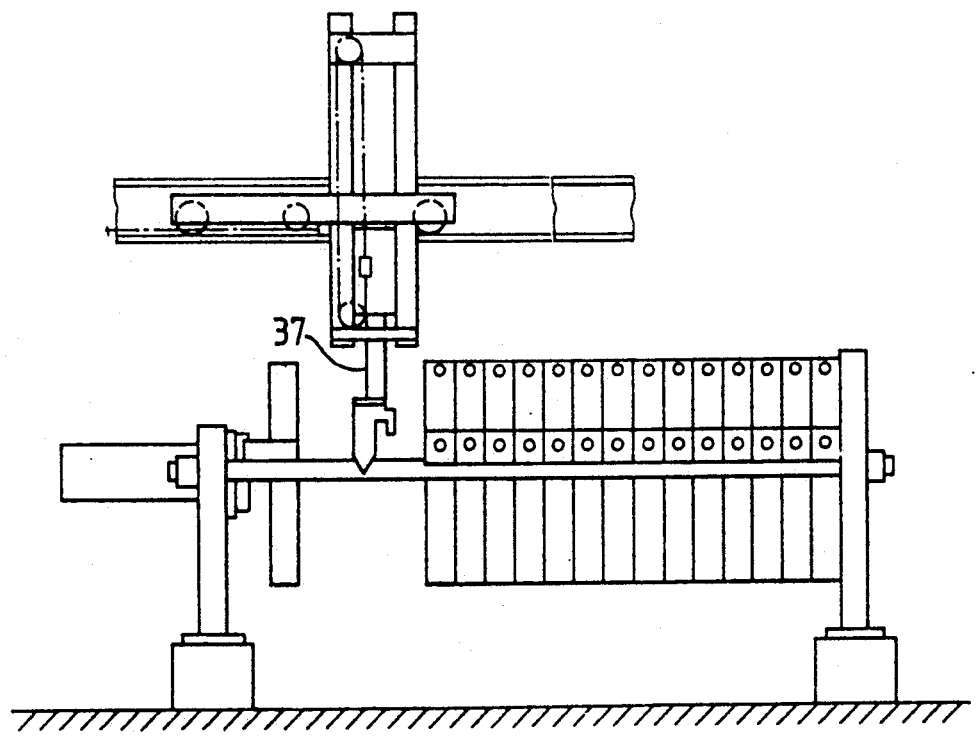
Figure 5C:
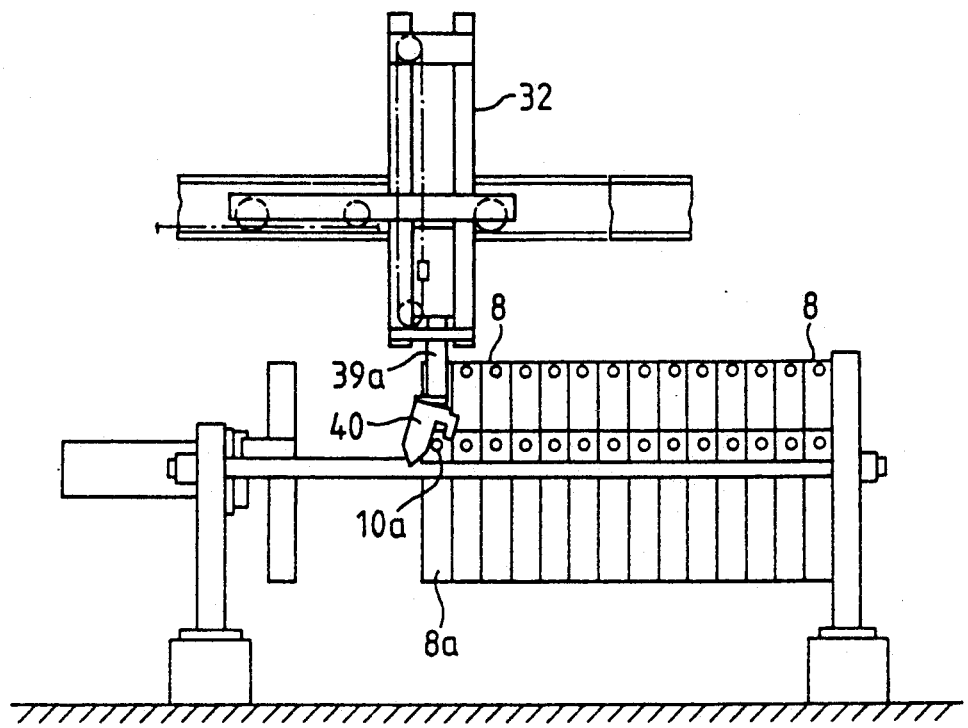

When a given amount of sludge has been pumped through filter press 1 and the hollow spaces between the filter plates 8 have become filled with suspended matter, the press plate 7 is pulled away from the filter plates 8 by means of the push-piston drive 6. The displacement device 32 is advanced on the rails 31a,b from a position of rest (shown in dashed line in FIG. 1) into a position between the press plate 7 and the first of the filter plates 8 (FIG. 5a), and the gripper 37 is lowered (FIG. 5b). The displacement device 32 is then pushed further towards the filter plates 8 until the separation wedges 40, which are suspended resiliently on the arms 39a,b, come against the driver bolts 10a,b of the first filter plate 8a and align the filter plates 8 precisely transverse to the longitudinal direction (FIG. 5c).

Figure 5D:
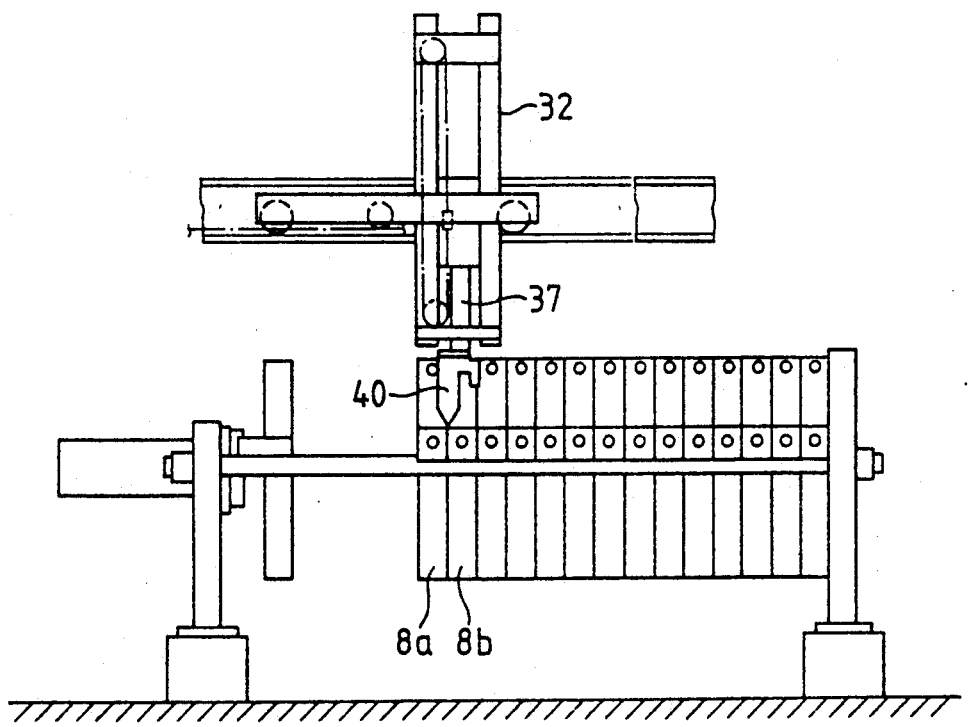
Figure 5E:
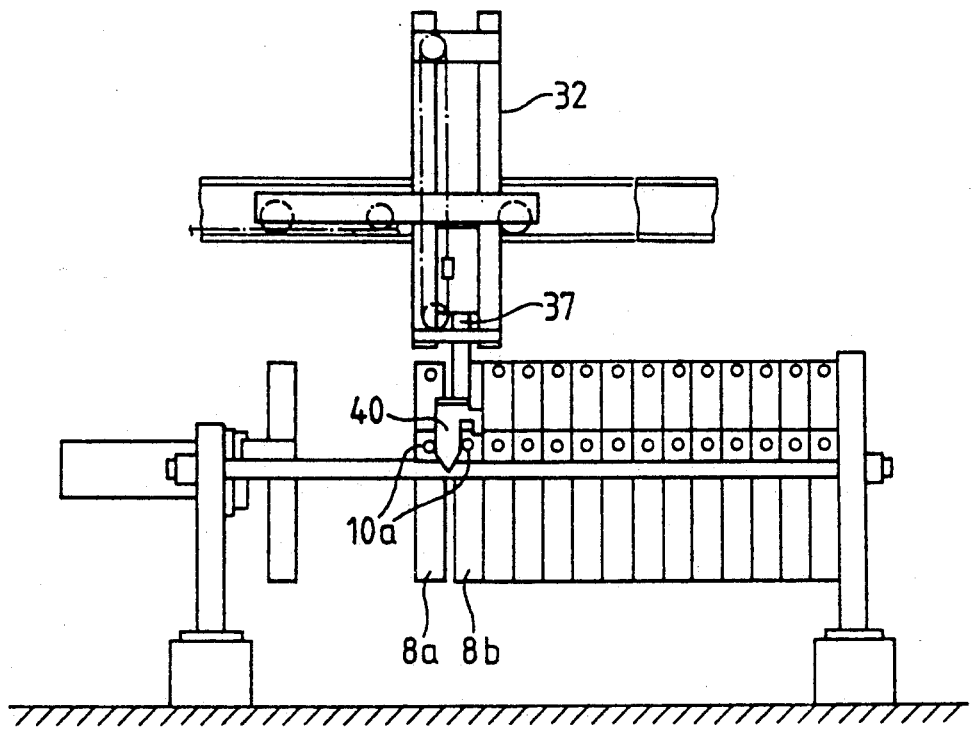

The gripper 37 is then raised slightly and the displacement device 32 is pushed forward so that the separation wedges 40 finally hold the center between the first filter plate 8a, and the second filter plate 8b (FIG. 5d). The gripper 37 is then lowered again so that the separation wedges 40 are pushed between the driver bolts 10a, b of the adjacent filter plates 8a,b and the latter are separated (FIG. 5e).

Figure 5F:
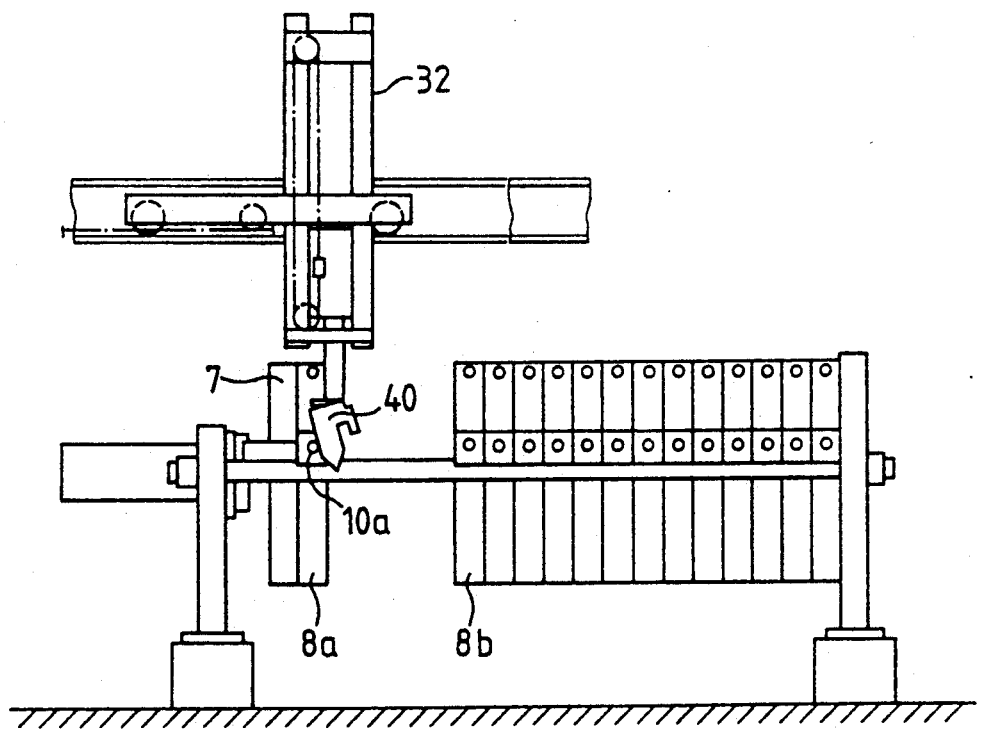

Finally, the displacement device 32 is pushed against the press plate 7, it carrying the first filter plate 8a along with it via the separation wedges 40 and the driver bolts 10a,b until the filter plate 8a comes against the press plate 7 (FIG. 5f). The displacement device 32 is then set in motion in the direction towards the remaining filter plates 8 and again brought into the position shown in FIG. 5a.

Figure 6A:
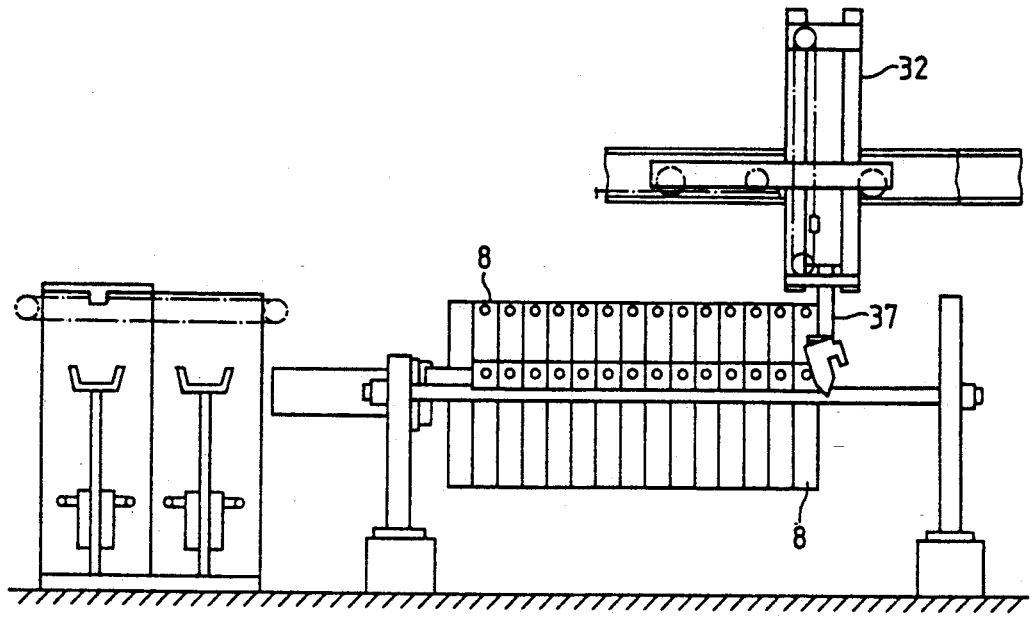
Figure 6B:
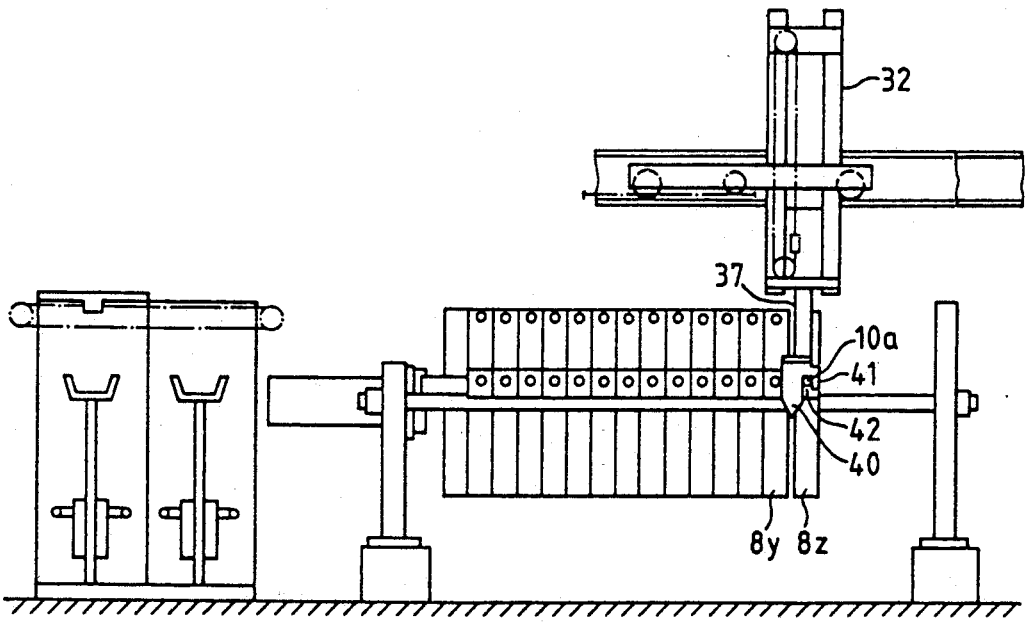
Figure 6C:
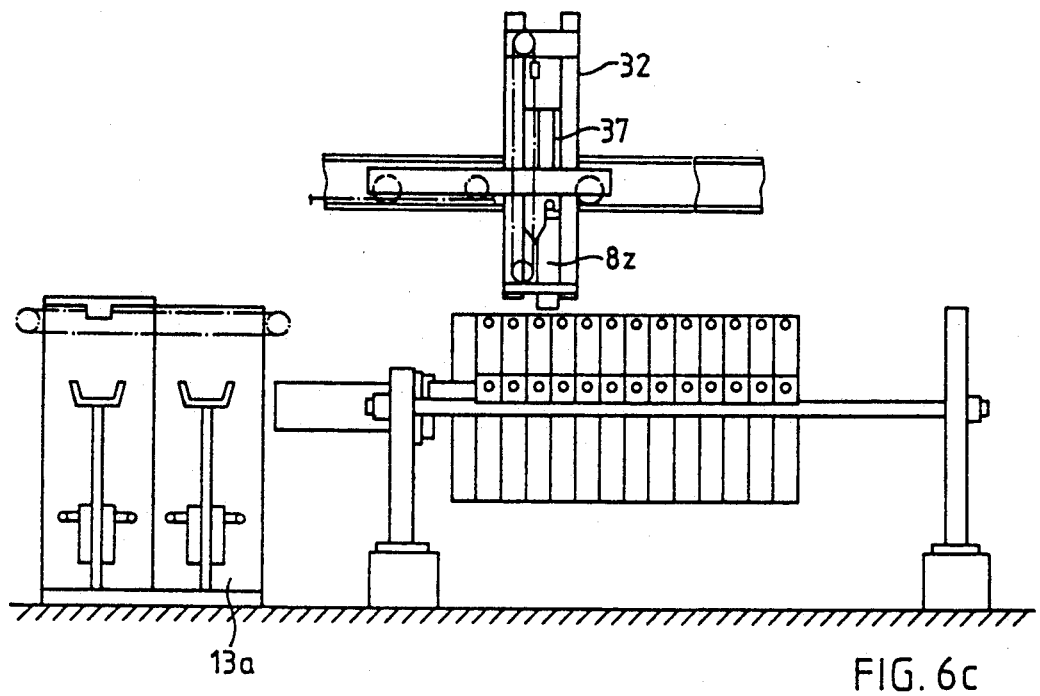

This process is repeated until all filter plates 8 have been displaced and the hollow spaces enclosed by them have been emptied (FIG. 6a).

Starting from the position shown in FIG. 6a, the gripper 37 is raised somewhat and the displacement device 32 displaced until the separation wedges 40 are in the center between the last filter plate 8z and the next to the last filter plate 8y. The gripper 37 is then lowered so that the separation wedges are pushed between the driver bolts 10a,b of the filter plates 8y, 8z and separate the latter. The driver bolts 10a,b of the last filter plate 8z then lie in the slot 42 formed between the separation wedge 40 and the drive finger 41, into which slot they fit with slight tolerance so that the position of the filter plate 8z is precisely controlled.

Figure 3:
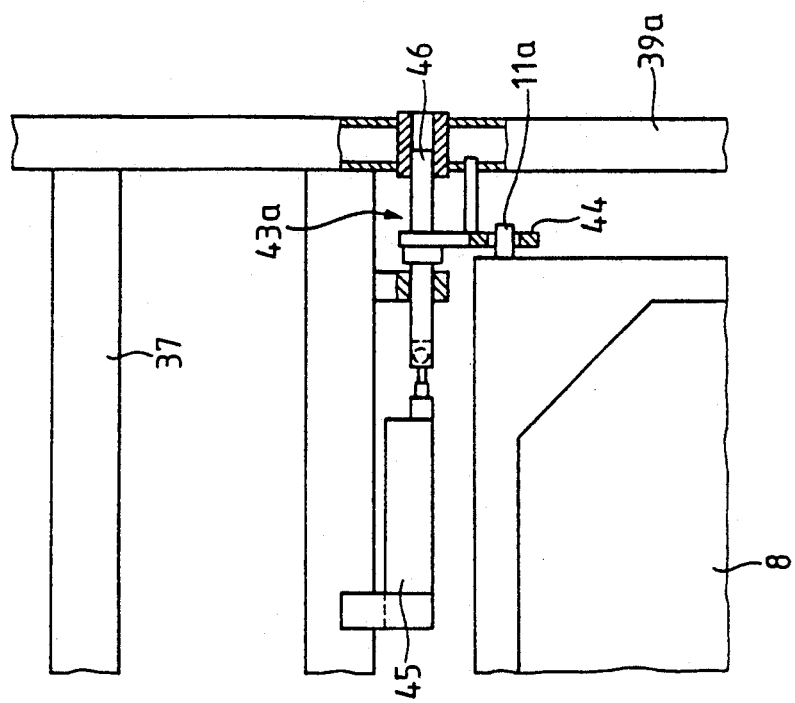
FIG. 3 is an enlarged view of a portion of FIG. 2, shown partially in section.
Figure 2:
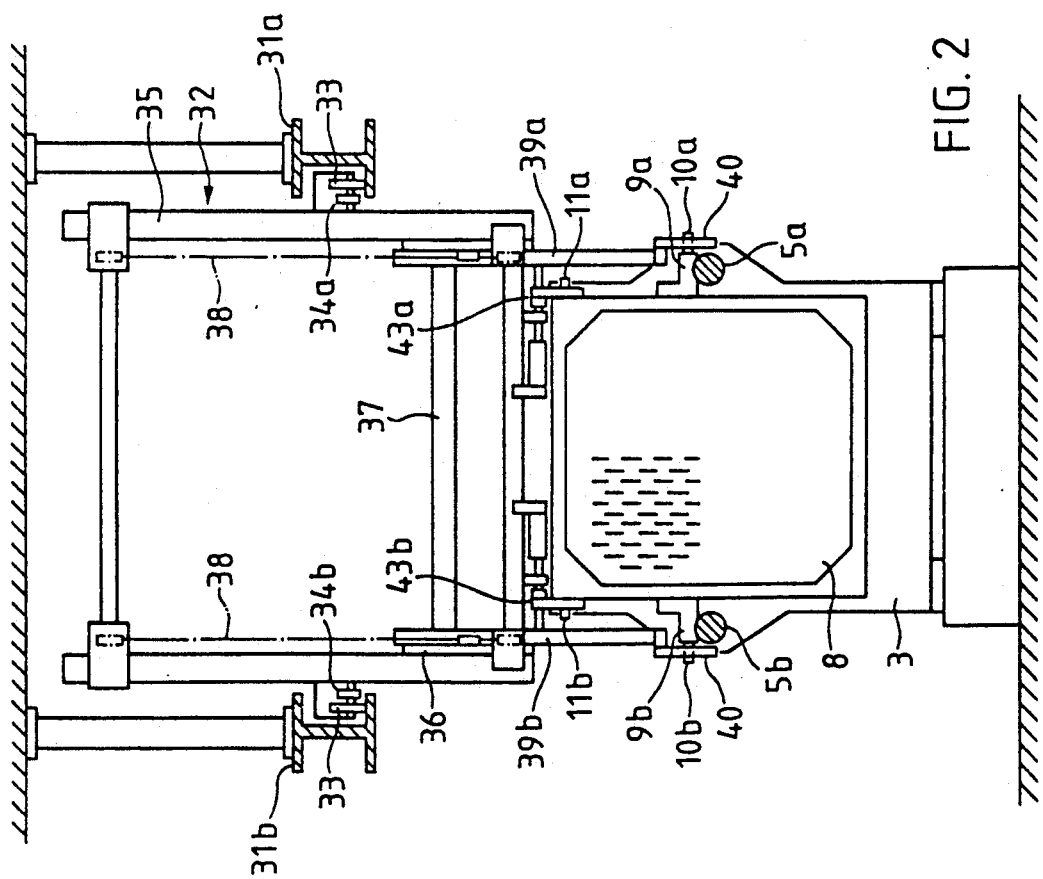
FIG. 2 is a cross section through the filter plant of FIG. 1.
Figure 6D:
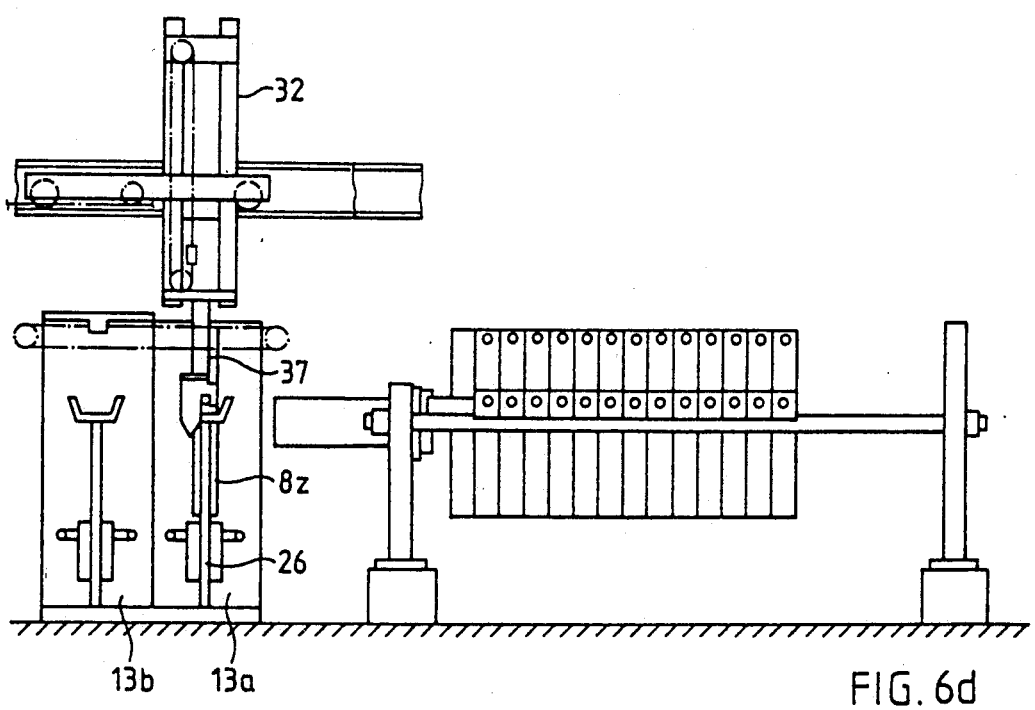
Figure 6E:
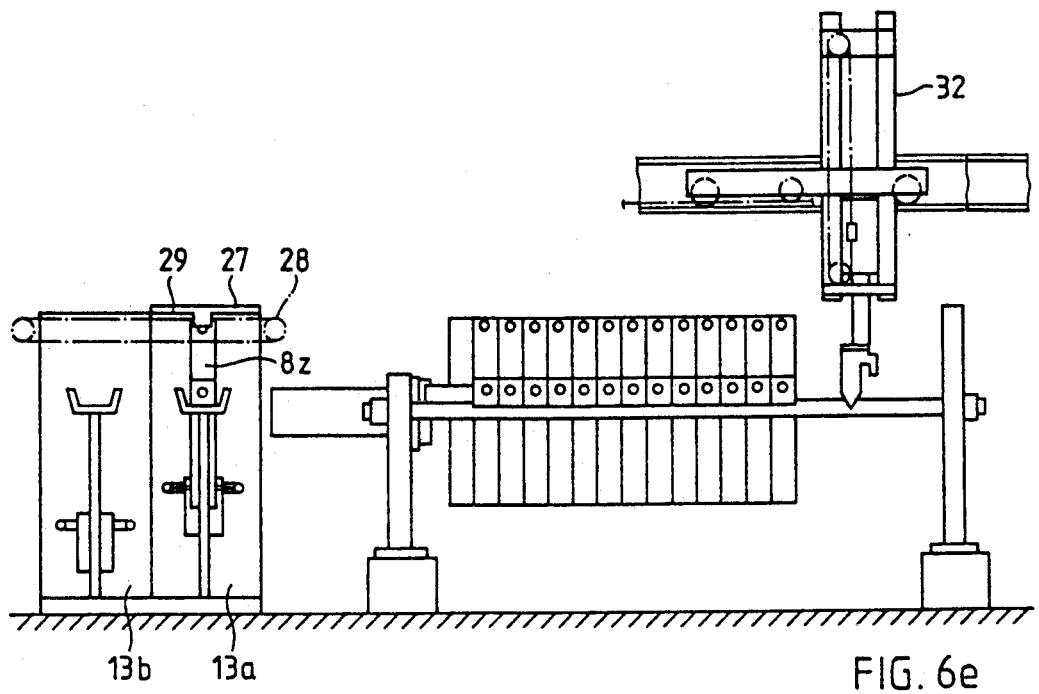

The carrier pipes 46 of the gripper pawls 43a,b are now pulled inward (FIGS. 2, 3) by means of the lift piston drive 45 so that the lugs 44 are pushed over the carrier bolts 11a, b of the filter plate 8z. The gripper 37, together with the filter plate 8z, is then raised and finally the displacement device 32 is displaced (FIG. 6c) until it has arrived above the wash chamber 13a. In that position, the gripper 37 is lowered and the filter plate 8z is deposited on the holding pedestal 26 (FIG. 6d). The gripper pawls 43a,b are then pushed again into the unlocked position and the gripper 37 is lifted.

The cover 27 is then pushed by the surrounding drive 28 from the position above the wash chamber 13b to a position above the wash chamber 13a, closing the opening 29 of the latter, and the filter plate 8z is cleaned.

Figure 6F:
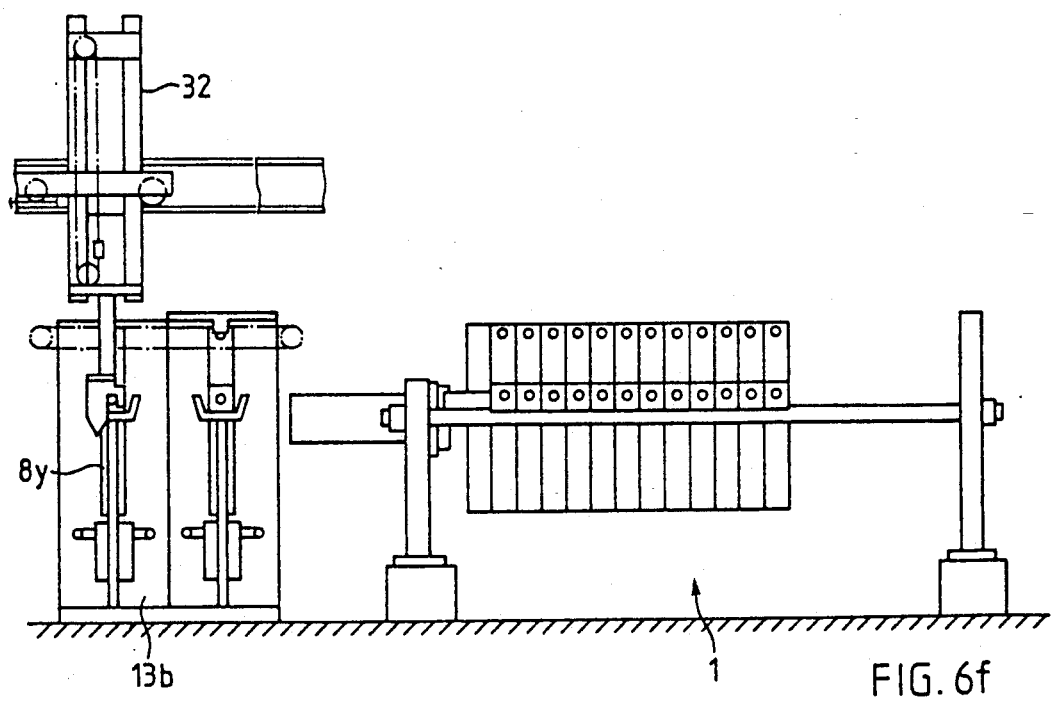
Figure 6G:
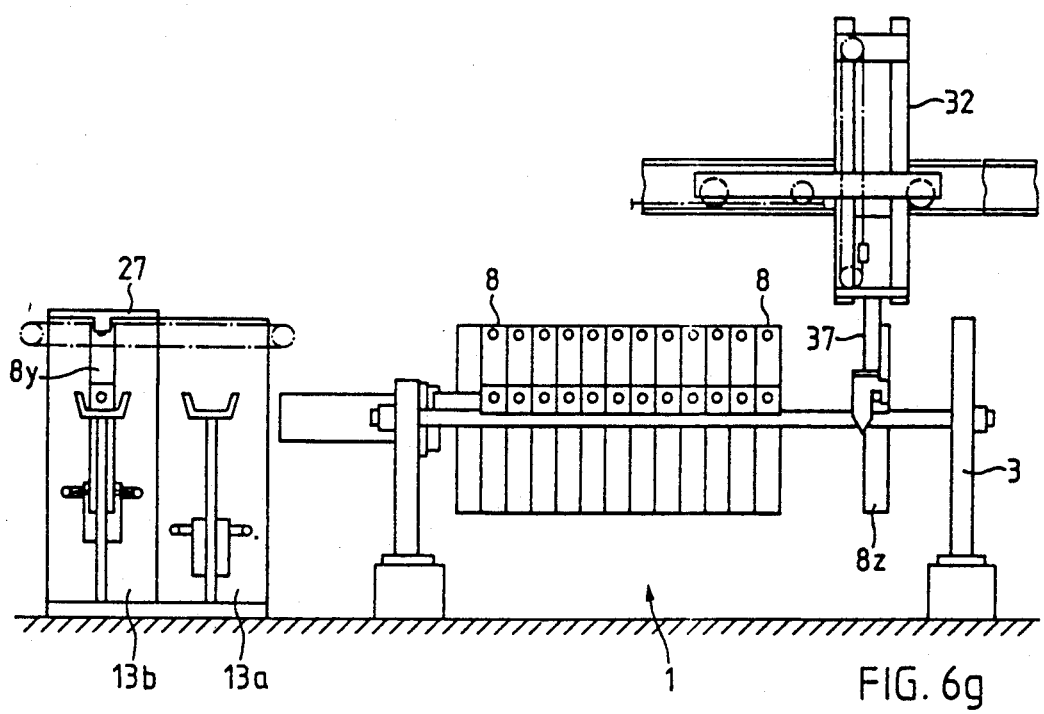

While the filter plate 8z is washed in the wash chamber 13a, the next filter plate 8y is obtained from the filter press 1 by the displacement device 32, (FIG. 6e) and placed in the wash chamber 13b (FIG. 6f). The washing process in the wash chamber 13a has been completed in the meantime. The cover 27 is shifted from the wash chamber 13a to the wash cham-ber 13b, i.e. the former is opened and the latter is closed.

While the filter plate 8y is being washed in the wash chamber 13b, the filter plate 8z is grasped by the gripper 37 in the wash chamber 13a in the manner already described, lifted and transported back to the filter press 1, where it is deposited (FIG. 6g) and pushed against the head stand 3. On its return path, the displacement device 32 carries the next filter plate along with it and deposits it for cleaning in the wash chamber 13a, and so on until all filter plates 8 are again present, cleaned, in the filter press 1, which is then closed by means of the press plate 7 and is ready for the next filtration cycle.

Figure 4A:
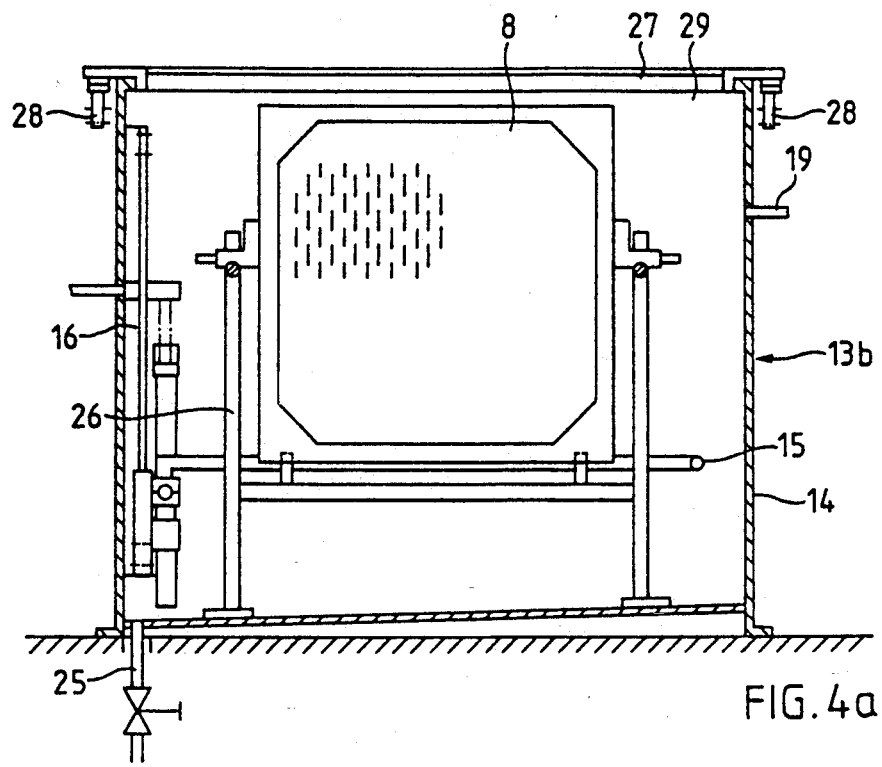
FIG. 4a is a cross section through the cleaning plant.
Figure 4B:
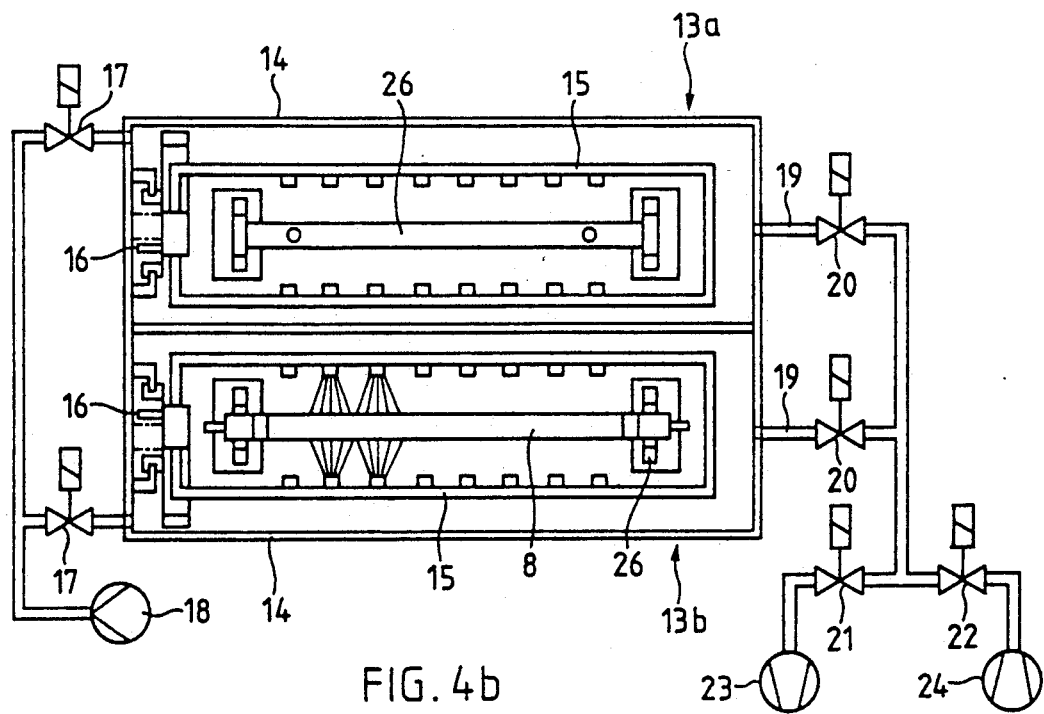
FIG. 4b is a horizontal section through the cleaning plant.

The cleaning of a filter plate 8 is effected (FIG. 4a, b) in the manner that the valve 17 is opened and the filter plate 8 is sprayed with cleaning liquid—water, soap solution or the like—by the spray pipe 15 which surrounds it and is moved up and down. The spent cleaning liquid discharges through the outlet 25. At the same time, the valves 20 and 21 are opened and the suction blower 23 is operated. In this way, the air in the wash chamber 13b, which contains a large amount of aerosols produced upon the spraying, is continuously withdrawn so that the aerosols cannot deposit again on the filter plate 8.

During the washing, the wash chambers 13a,b are so tightly closed that an exchange of gas with the region of the filter press 1, which could lead to contamination by aerosols of filter plates which have already been cleaned, is practically completely out of the question. Here also, the measures necessary are, of course, dependant on the field of use. Mere spatial separation of the cleaning plant 12 from the filter press 1 might also be sufficient.

After the spraying, the filter plate 8 can be sprayed with other liquids, such as disinfectants or impregnating agents. Finally, filtered hot air is blown into the wash chamber 13b by the drying blower 24 via the valve 22—the valve 21 is closed at this time—and the filter plate 8 is dried. Of course, all of the steps enumerated are not always necessary. The selection depends on the application.

Instead of the spraying, or in addition to it, the filter plate 8 can also be subjected to an immersion bath in the manner that the water-tight housing 14 of the wash chamber 13b is completely filled with cleaning liquid.

The provision of two wash chambers 13a,b in the cleaning plant 12 has the advantage that idle paths of the displacement device 32 can be substantially avoided.

Various combinations and arrangements of filter presses 1 and cleaning plants 12 are possible. The numbers depend in this connection on the need for cleaning, and the arrangement will depend on the space available. It is very favorable to arrange the cleaning plant 12 in longitudinal direction alongside the filter plate 1 insofar as the displacement device 32 must be displaceable only in one horizontal direction and the transport device 30 can thus be of greatly simplified construction.

When less cleaning is required—the cleaning need not be carried out in all cases after each discharge of the filter press—and sufficient space in one direction is present it is favorable to construct two filter presses in a line, with a cleaning plant in between. One transport device is then sufficient for both filter presses.

We claim:

1. A filter plant comprising:
    at least one filter press including a plurality of filter plates;
    at least one separate cleaning means for cleaning said filter plates, said cleaning means including chamber means for defining at least one sealed wash chamber for the filter plates, said wash chamber being configured to receive one of said filter plates therein for cleaning, wherein the chamber means is spaced from the filter press so that gas exchange between them is substantially prevented;
    and transport means for removing the filter plates from the filter press and transporting the filter plates between the filter press and the cleaning means.

2. A filtration plant according to claim 1, wherein said at least one wash chamber is comprised of a closable housing, and said cleaning means includes spray means arranged in said housing.

3. A filtration plant according to claim 2, wherein the spray means includes at least one spray pipe, and means for displacing said spay pipe along the inner walls of the housing.

4. A filter plant according to claim 2, wherein said closable housing is provided with a suction blower, and means for connecting said suction blower to said at least one wash chamber.

5. A filtration plant according to claim 2, wherein the closable housing is provided with a drying blower, and means for connecting said drying blower to said at least one wash chamber.

6. A filtration plant according to claim 2, wherein the closable housing of said at least one wash chamber has an opening in a top surface thereof which can be closed by a cover.

7. A filtration plant according to claim 6, wherein said at least two wash chambers are arranged directly alongside each other, wherein said cover is configured to close a single said opening, and means for displacing said cover to close a selected one of said openings.

8. A filtration plant according to claim 6, wherein the housing of said at least one wash chamber has bottom and side walls that are water tight.

9. A filtration plant according to claim 2, wherein said chamber means includes at least two of said wash chambers, each said wash chamber having a respective said opening.

10. A filtration plant according to claim 1, wherein the transport means comprises at least one displacement means for displacing a said filter plate, and means for movably mounting said displacement device above said at least filter press (1) and said at least one cleaning means.

11. A filtration plant according to claim 10, wherein said means for movably mounting said transport means comprises rails on which said at least one displacement means is suspended along and along which it is movable.

12. A filtration plant according to claim 10, wherein said at least one displacement means includes lifting means for lifting a said filter plate, said lifting means including gripper means for selectively gripping a said filter plate.

13. A filtration plant according to claim 12, wherein the filter press comprises two parallel spars, the filter plates are equipped with two lateral support grip means for support on the spars, and the gripper means has two arms each of which bears at its end a separation wedge means engageable between the support grip means of two adjacent filter plates for separating a selected one of said filter plates from an adjacent said filter plate.

14. A filtration plant according to claim 13, wherein the arms are provided with downwardly open slots and the filter plates have opposed sides on which driver bolts are arranged so as to fit in said slots.

15. A filtration plant according to claim 12, wherein the gripper means is provided with gripper pawls provided so as to be engageable with carrier bolts, said carrier bolts being arranged laterally on opposed sides of the filter plates in the region of an upper end of the filter plates when said plates are vertically arranged.

16. A filtration plant according to claim 1, wherein said at least one filter press has a longitudinal axis, one said at least one cleaning means being arranged on said longitudinal axis alongside of said at least one filter press.

17. A filtration plant according to claim 1, wherein said at least one filter press comprises two filter presses arranged along a common longitudinal axis, wherein a said cleaning means is arranged between said two filter presses on said longitudinal axis.

* * * * *